United States Patent [19]

Paulick

[11] Patent Number: 5,710,987
[45] Date of Patent: Jan. 20, 1998

[54] RECEIVER HAVING CONCEALED EXTERNAL ANTENNA

[75] Inventor: Thomas Eugene Paulick, Palatine, Ill.

[73] Assignee: Motorola, Inc., Schaumburg, Ill.

[21] Appl. No.: 459,376

[22] Filed: Jun. 2, 1995

Related U.S. Application Data

[63] Continuation of Ser. No. 23,234, Feb. 25, 1993, abandoned.

[51] Int. Cl.$^6$ .................................. H04B 1/03; H04B 1/08
[52] U.S. Cl. ........................ 455/90; 455/128; 455/129;
455/349; 455/351; 343/702; 361/814
[58] Field of Search ........................... 455/89, 90, 128,
455/129, 269, 280, 347–351; 379/57, 58,
61, 433; 340/311.1, 825.44; 343/702; 361/814

[56] References Cited

U.S. PATENT DOCUMENTS

| H160 | 11/1986 | Focarile et al. | 379/60 |
|---|---|---|---|
| Re. 33,417 | 10/1990 | Bhagat et al. | 379/57 |
| 4,847,818 | 7/1989 | Olsen | 455/350 X |
| 5,040,204 | 8/1991 | Sasaki et al. | 379/61 |
| 5,117,449 | 5/1992 | Metroka et al. | 379/58 |
| 5,134,724 | 7/1992 | Gehring | 455/351 X |
| 5,153,903 | 10/1992 | Eastmond et al. | 379/57 |
| 5,170,173 | 12/1992 | Krenz | 455/347 |
| 5,258,892 | 11/1993 | Stanton et al. | 455/351 |
| 5,392,461 | 2/1995 | Yukio | 455/89 |

FOREIGN PATENT DOCUMENTS

| 0 212 761 | 8/1986 | European Pat. Off. | |
| 0522538 | 1/1993 | European Pat. Off. | 455/347 |
| 60-46627 | 3/1985 | Japan . | |
| 63-224422 | 9/1988 | Japan . | |
| 0305726 | 12/1989 | Japan | 455/351 |

OTHER PUBLICATIONS

Faris Howat, "The Mitsubishi International 4000", Cellular Business, Dec. 1992, pp. 68–78.

Seth Malgieri, "West Coase Firm Puts 'Beep' Inside Cellular Telephone", Radio Communication Report, Dec. 17, 1990, pp. 1 and 22.

*Primary Examiner*—Chi H. Pham
*Attorney, Agent, or Firm*—Kevin D. Kaschke

[57] ABSTRACT

A radiotelephone/pager unit (100) includes a housing enclosing (102, 104) radiotelephone circuitry (224) coupled to a radiotelephone antenna (108) operable at radiotelephone frequencies and pager circuitry (218) coupled to a pager antenna (212) operable at pager frequencies. The radiotelephone antenna (108) is located outside the housing (102, 104) in a conventional manner. The pager antenna (212) is located outside the housing (102, 104) and concealed under or integrally formed with a hand grip (122), a display lens (402), an escutcheon (502), a keypad (110), or a cap (601) such that the pager antenna's presence is unnoticeable to a user. The pager antenna (212) forms a loop antenna substantially surrounding a user interface element such as a display (112), a keypad (110), an earpiece (114) or volume control buttons (118, 120) to minimize space.

23 Claims, 5 Drawing Sheets

RECEIVER HAVING CONCEALED EXTERNAL ANTENNA

This is a continuation of application Ser. No. 08/023,234, filed Feb. 25, 1993 and now abandoned.

FIELD OF THE INVENTION

The present invention relates generally to antennas and more particularly to concealment of a pager antenna external to a radiotelephone/pager unit.

BACKGROUND OF THE INVENTION

Paging systems And radiotelephone systems, such as cellular radiotelephone systems, have gained widespread acceptance over the years. The trend in growth of these systems has continued to be positive, especially as the technology has evolved to enable reductions in the size and weight of pagers and portable cellular radiotelephones. Many of the users of portable cellular radiotelephones have continued to be users of pagers, which has resulted in the requirement that those users carry not only a portable cellular radiotelephone but also a pager. With the trend in technology continuing to enable further miniaturization of both portable cellular radiotelephones and pagers, it is now possible to combine both elements into a single portable unit. Such a combination, however, has been shown to create problems not previously encountered when both the portable cellular radiotelephone and the pager were separate units.

The portable radiotelephone typically has an antenna outside an at least partially shielded housing for transmitting and receiving radio frequency signals at radiotelephone frequencies. The pager typically has an antenna inside an unshielded housing for receiving radio frequency signals pager frequencies. When a pager is combined with the portable radiotelephone into a single unit, the location of the radiotelephone antenna and the pager antenna is considered.

The most likely place for the radiotelephone's antenna is at its conventional location outside the radiotelephone housing. Consideration is given to the location of the pager's antenna both inside and outside the radiotelephone's housing. The pager antenna can not be located inside the radiotelephone's shielded housing portion, since the shielded housing would prevent the pager's antenna from receiving paging signals. The pager's antenna can be located inside an unshielded portion of the radiotelephone's housing, however, the compactness of a single unit makes unshielded locations rare. Furthermore, remotely locating the pager's antenna from the pager circuitry to reach an unshielded location produces inefficiencies in the pager's antenna. The pager antenna can be located outside the radiotelephone's housing. However, locating the pager antenna in addition to the radiotelephone antenna outside the radiotelephone's housing would change the external appearance of the radiotelephone and possibly increase its size.

Thus, there is a need for a beneficial location for the pager antenna without compromising the antenna's performance or the appearance and size of the unit.

DETAILED DESCRIPTION OF THE PREFERRED EMBODIMENTS

Figure 1:
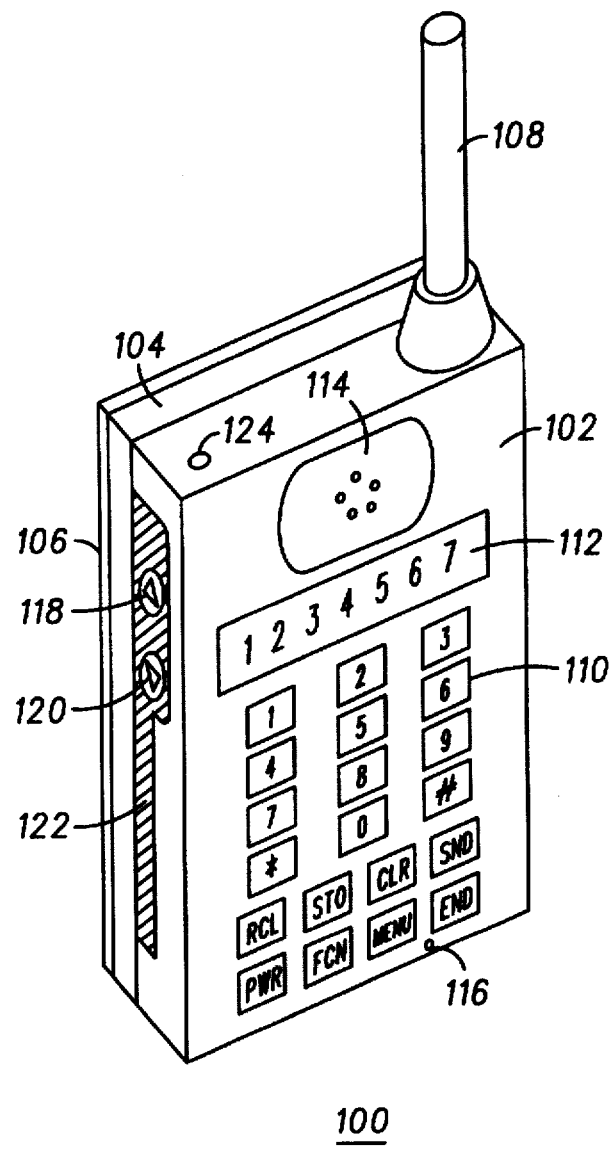
FIG. 1 is a perspective view of a radiotelephone/pager unit constructed in accordance with the present invention.

Referring now to FIG. 1, there is shown a perspective view of a combination radiotelephone/pager unit 100 constructed in accordance with the present invention. The unit 100 generally includes: a front housing 102, a back housing 104, a battery 106, a radiotelephone antenna 108, a keypad 110, a display 112, an earpiece 114, a microphone 116, volume control buttons 118 and 120, a hand grip 122 and an alert 124.

The external appearance and functionality of the unit's radiotelephone portion is similar to that of a conventional portable cellular radiotelephone, model number 1293A, manufactured and available from Motorola, Inc. The functionality of the unit's pager portion is similar to that of a conventional pager, named "Bravo", also manufactured and available from Motorola, Inc. The user interface such as the keypad 110, volume control buttons 118 and 120, display 112 and alert 124 are commonly used by both the radiotelephone portion and the pager portion of the unit 100.

The unit 100 uses the radiotelephone antenna 108 to conventionally transmit and receive radiotelephone signals at radiotelephone frequencies. The unit 100 uses a pager antenna (not shown in FIG. 1) to conventionally received pager signals at pager frequencies.

A unique element of the present invention which will be shown and discussed later in the preferred embodiments of the present invention is that the pager antenna is located outside the radiotelephone's housing and yet not noticeable to a user. The following preferred embodiments of the present invention will show the pager's antenna being concealed by covers forming conventional radiotelephone parts including but not limited to the hand grip 122, the keypad 110, a lens of the display 112 and also by a cap secured to the front housing 102. Benefits of concealing the pager antenna with these covers outside the radiotelephone's housing include maintaining the radiotelephone's external appearance, having the pager's antenna outside any shielded portion of the radiotelephone's housing and keeping the pager's antenna close to the pager's circuitry. The following preferred embodiments of the present invention will also show the pager's antenna forming a loop substantially surrounding the tactile, visual and acoustic user interface of the unit 100 including but not limited to the volume control buttons 118 and 120, the keypad 110, the display 112, and the earpiece 102. Surrounding user interface of the unit 100 with a loop antenna beneficially minimizes the space consumed by the antenna for the unit 100.

Figure 2:
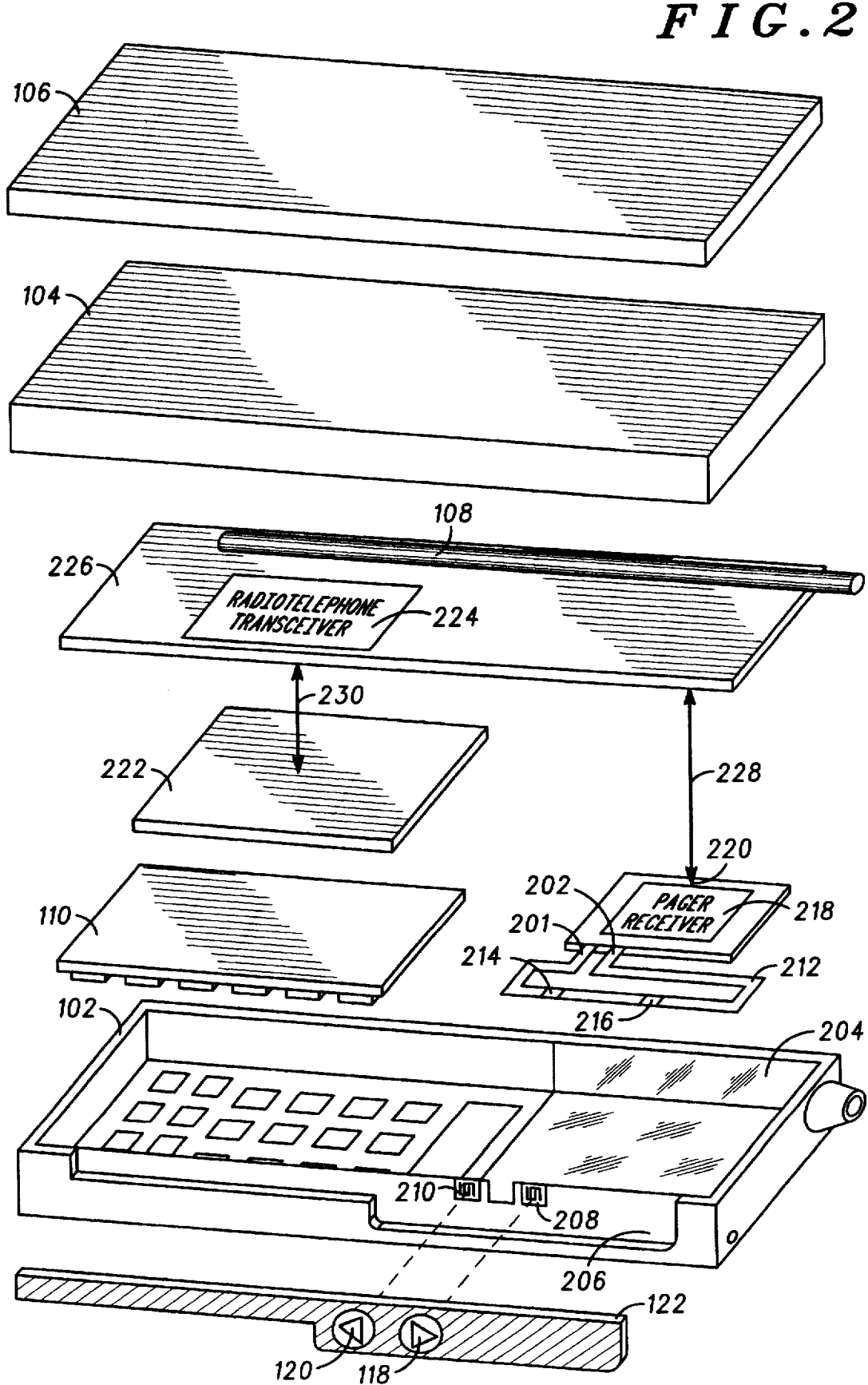
FIG. 2 is an exploded view of the radiotelephone/pager unit of FIG. 1 showing a first location of a pager antenna.

Referring now to FIG. 2 there is shown an exploded view of the radiotelephone/pager unit 100 of FIG. 1 showing a first preferred location of a pager antenna. FIG. 2 generally includes: the hand grip 122 having the volume control buttons 118 and 120, the front housing 102 including a shielded portion 204, a recess 206 and discrete volume control contacts 208 and 210, a pager antenna 212 including capacitors 214 and 216, pager receiver circuitry 218 on a printed circuit board 220, the keypad 110, a keypad printed circuit board 222, radiotelephone transceiver circuitry 224 on a printed circuit board 226, the radiotelephone's antenna 108, the rear housing portion 104 and the battery 106.

The radiotelephone's antenna 108 is coupled to the radiotelephone's transceiver circuitry 224 for transmitting and receiving radio frequency signals at radiotelephone frequencies. The pager antenna 212 is coupled to the pager receiver circuitry via terminals 201 and 202 for receiving radio frequency signals at pager frequencies. Arrow 228 represents electrical interconnection between the pager receiver circuitry 218 and the radiotelephone transceiver circuitry 224. Arrow 230 represents electrical interconnection between the keypad printed circuit board 222 and the radiotelephone transceiver circuitry 224. All of the elements of FIG. 2 with the exception of the pager's antenna 212 are conventionally assembled to produce the completed unit 100. Note that although three printed circuit boards 220, 222 and 226 are shown in FIG. 2, they are permitted to be combined into one circuit assembly if desirable.

The pager antenna 212 forms a conventional loop antenna having tuning capacitors 216 and 214 permitting adjustment of the loop antenna. The loop antenna is used for its space saving attributes in confined areas. Preferably, the loop antenna is formed as a conductive pattern disposed on a insulated substrate, such as a conventional circuit board.

The first preferred location of the pager antenna 212 is disposed outside the shielded portion 204 of the front housing 102, under the hand grip 122 and surrounding the volume control buttons 118 and 120 and their corresponding contacts 208 and 210. The pager antenna 212 is disposed in a recess 206 formed in the front housing portion 102 such that the presence of the pager's antenna under the hand grip 122 is unnoticeable to the user. When the pager antenna and the hand grip 122 are assembled with the front housing 102, the hand grip 122 maintains an essentially planar position with respect to the front housing 102.

Figure 3:
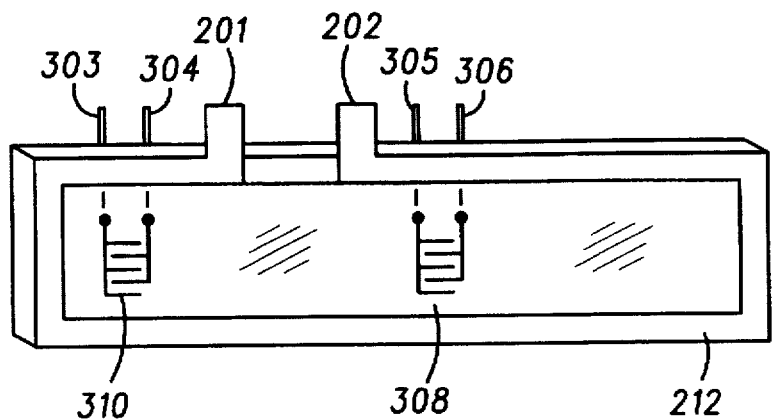
FIG. 3 is a perspective view of the pager antenna of FIG. 2 integrally formed with switch contacts.

Referring now to FIG. 3, there is shown a perspective view of the pager antenna of FIG. 2 integrally formed with the contacts 208 and 210 to produce integral contacts 308 and 310. The pager antenna 212 formed as a conductive pattern loop and the contacts 308 and 310 are formed as conductive patterns disposed on an insulated substrate such as a circuit board. Terminals 201 and 202 provide coupling for the loop antenna and terminals 303–306 provide coupling for the integral contacts 308 and 310. This design approach provides the advantages of lower parts count, cost and assembly time over the discrete contacts 208 and 210 of FIG. 2.

Figure 4:
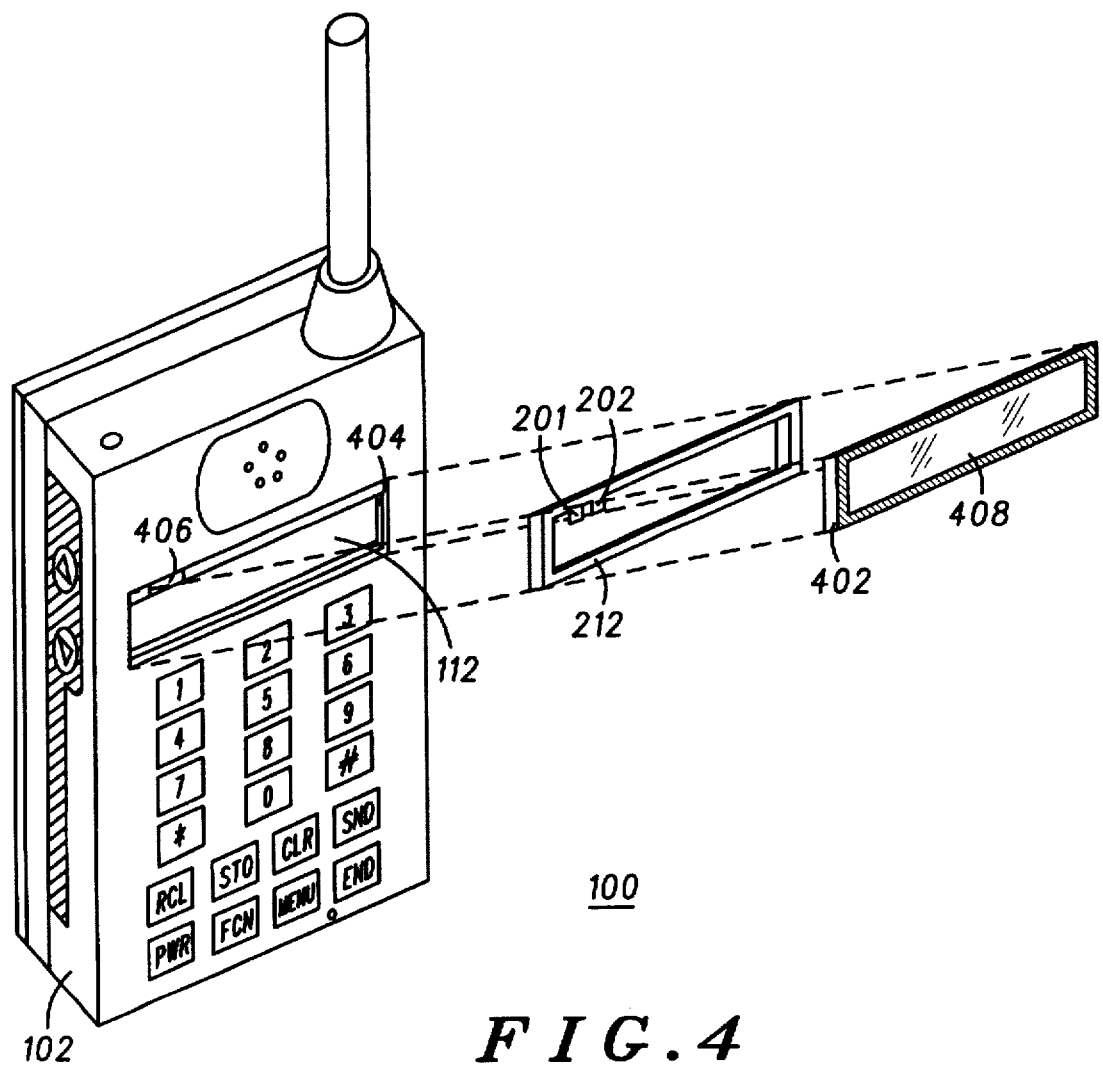
FIG. 4 is an exploded view of the radiotelephone/pager unit of FIG. 1 showing a second location of the pager antenna.

Referring now to FIG. 4, there is shown an exploded view of the radiotelephone/pager unit 100 of FIG. 1 showing a second preferred location of the pager antenna 212. The second preferred location of the pager antenna 212 is disposed outside the front housing 102, under a display lens 402 and surrounding the display 112. The pager antenna forms a loop antenna configured to be disposed on a recessed ledge 404. The pager antenna terminals 201 and 202 couple to the pager receiver circuitry 218 via a hole 406 in the front housing 102. The display lens 402 has has opaque boarder 408 for concealing the pager antenna 212 under the display lens 402. Note that with the location of the pager receiver circuitry at the earpiece end of the unit 100, the pager antenna at the display area remains close to the pager receiver circuitry.

Figure 5:
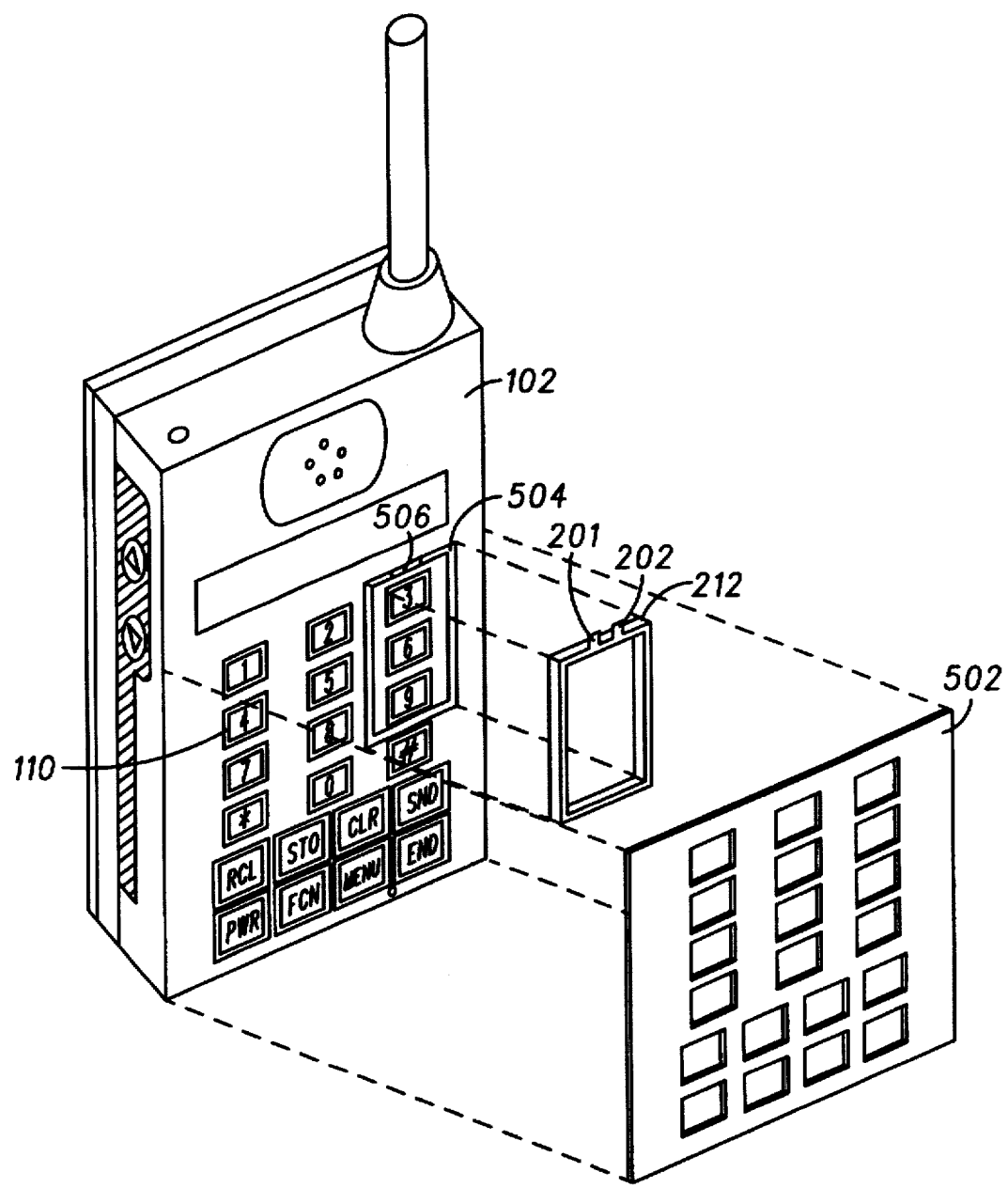
FIG. 5 is an exploded view of the radiotelephone/pager unit of FIG. 1 showing a third location of the pager antenna.

Referring now to FIG. 5, there is shown an exploded view of the radiotelephone/pager unit of FIG. 1 showing a third preferred location of the pager antenna. The third preferred location of the pager antenna 212 is disposed outside the front housing 102, under an escutcheon 501 and surrounding a portion of the keypad 110. The pager antenna forms a loop antenna configured to be disposed in a recess 504. The pager antenna terminals 201 and 202 couple to the pager receiver circuitry 218 via a hole 506 in the front housing 102. The escutcheon 502 has an opaque surface for concealing the pager's antenna 212 under the escutcheon 502. Note that this location of the pager antenna is close to pager receiver circuitry located under the keypad 110 of the unit 100. The escutcheon 502 for the keypad 110 is generally considered to be a separate cover attachable to the unit 100 including but not limited to a nameplate. An alternative practice for concealing the pager antenna that is equivalent to using the escutcheon is a membrane keypad wherein at least the top surface of the keypad exposed to the user covers not only the pager antenna 212 but also the portion of the front housing 102 between individual keypad buttons.

Figure 6:
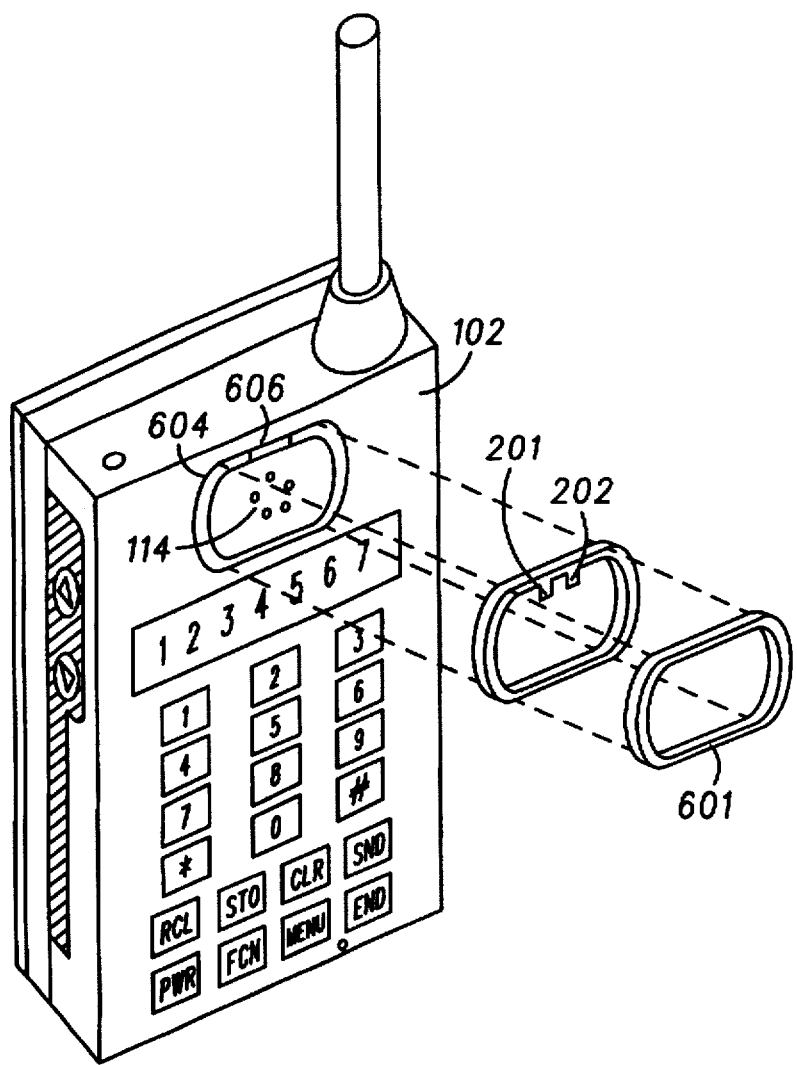
FIG. 6 is an exploded view of the radiotelephone/pager unit of FIG. 1 showing a fourth location of the pager antenna.

Referring now to FIG. 6, there is shown an exploded view of the radiotelephone/pager unit 100 of FIG. 1 showing a fourth preferred location of the pager antenna. The fourth preferred location of the pager's antenna 212 is disposed outside the front housing 102, under a cap 601 and surrounding the earpiece 104. The pager's antenna forms a loop antenna configured to be disposed in a recess 604. The pager's antenna terminals 201 and 202 couple to the pager receiver circuitry 218 via a hole 606 in the front housing 102. The cap 601 has an opaque surface, preferably matching the front housing, for concealing the pager's antenna 212 under the cap 601. The cap 601 is attachable to the front housing 102 and shaped to provide styling for the unit 100. Note that this location of the pager antenna is close to pager receiver circuitry located in the earpiece portion of the unit 100. Note that the earpiece 114 represents any electroacoustic transducer including but not limited to the microphone 116 and the alert 124.

The discussion for each of the four preferred locations for the pager's antenna describe the pager antenna being located within a recess of the front housing 102. An alternative design to the housing recess producing an equivalent result as the housing recess is to place the recess in the part itself (i.e. a recess in the hand grip 122, lens 402, escutcheon 502 and the cap 601) rather than in the front housing 102. Additionally, the pager antenna may also be integrally formed with the part rather than being a separate part. This is accomplished by molding or assembling the loop antenna into the the hand grip 122, lens 402, escutcheon 502, keypad 110 and the cap 601, for example.

Although the preferred embodiments disclose the pager antenna as a loop antenna for space saving benefits, other antenna structures such as a dipole antenna producing substantially equivalent results may be substituted.

What is claimed is:

1. A combination radiotelephone/pager unit including a user interface, comprising:

a housing enclosing radiotelephone and pager circuitry;

a radiotelephone antenna coupled to the radiotelephone circuitry; and a pager antenna coupled to the pager circuitry;

wherein the pager antenna forms a loop surrounding at least a portion of the user interface and is disposed between an outside surface of the housing and the at least a portion of the user interface.

2. A combination radiotelephone/pager unit according to claim 1 further comprising a shield for shielding at least one of the radiotelephone and pager circuitry.

3. A combination radiotelephone/pager unit according to claim 1 wherein the user interface further comprises at least one of the following: an acoustic, a visual and a tactile interface.

4. A combination radiotelephone/pager unit according to claim 3 wherein the acoustic, visual and tactile interface further comprises an electroacoustic transducer, a display and a switch, respectively.

5. A combination radiotelephone/pager unit according to claim 1 wherein the pager antenna is integrally formed with at least a portion of the user interface.

6. A combination radiotelephone/pager unit comprising:

radiotelephone and pager circuitry;

a housing substantially enclosing the radiotelephone and pager circuitry;

an electromagnetic shield, disposed in the housing and at least partially covering at least one of the radiotelephone and pager circuitry, formed of an electrically conductive, electromagnetic wave-absorbing material for absorbing electromagnetic energy radiated by or towards the at least one of the radiotelephone and pager circuitry;

a radiotelephone antenna coupled to the radiotelephone circuitry;

a pager antenna coupled to the pager circuitry, carried on an outside, nonconductive surface of the housing and disposed outside the electomagnetic shield; and a substantially planar and detachable cover, attached to the outside, nonconductive surface of the housing, for concealing the pager antenna between the cover and the outside, nonconductive surface of the housing such that the pager antenna is unnoticeable to a user of the unit.

7. A combination radiotelephone/pager unit according to claim 6 wherein the cover further comprises at least one of the following: a hand grip, a keypad, a lens, an escutcheon, a keypad and a cap.

8. A combination radiotelephone/pager unit according to claim 6 wherein the pager antenna is disposed between the outside surface of the housing and the cover.

9. A combination radiotelephone/pager unit according to claim 6 wherein the pager antenna is integrally formed with the cover.

10. A combination radiotelephone/pager unit according to claim 9 wherein the user interface further comprises at least one of the following: an acoustic, a visual and an active interface.

11. A combination radiotelephone/pager unit according to claim 10 further comprises a user interface substantially surrounded by the loop antenna.

12. A combination radiotelephone/pager unit according to claim 11 wherein the user interface further comprises at least one of the following: an acoustic, a visual and a tactile interface.

13. A receiver including a user interface comprising:

a housing;

receiver circuitry disposed in the housing; and an antenna coupled to the receiver circuitry;

wherein the antenna forms a loop surrounding at least a portion of the user interface and is disposed between an outside surface of the housing and the at least a portion of the user interface.

14. A receiver according to claim 13 wherein the user interface further comprises at least one of the following: an acoustic, a visual and a tactile interface.

15. A receiver according to claim 14 wherein the acoustic, visual and tactile interface further comprises an electroacoustic transducer, a display and a switch, respectively.

16. A receiver according to claim 13 wherein the antenna is integrally formed with at least a portion of the user interface.

17. A receiver comprising:

receiver circuitry;

a housing substantially enclosing the receiver circuitry;

an electromagnetic shield, disposed in the housing and at least partially covering the receiver circuitry, formed of an electrically conductive, electromagnetic wave-absorbing material for absorbing electromagnetic energy radiated by or towards the receiver circuitry;

an antenna coupled to the receiver circuitry, carried on an outside, nonconductive surface of the housing and disposed outside the electomagnetic shield; and a substantially planar and detachable cover, attached to the outside, nonconductive surface of the housing, for concealing the antenna between the cover and the outside, nonconductive surface of the housing such that the antenna is unnoticeable to a user of the receiver.

18. A receiver according to claim 17 wherein the cover further comprises at least one of the following: a hand grip, a keypad, a lens, an escutcheon, a keypad and a cap.

19. A receiver according to claim 17 wherein the antenna is disposed between the outside surface of the housing and the cover.

20. A receiver according to claim 17 wherein the antenna is integrally formed with the cover.

21. A receiver according to claim 17 wherein the antenna further comprises a loop antenna.

22. A receiver according to claim 21 further comprises a user interface substantially surrounded by the loop antenna.

23. A receiver according to claim 22 wherein the user interface further comprises at least one of the following: an acoustic, a visual and a tactile interface.

* * * * *